United States Patent [19]

Derango et al.

[11] Patent Number: 5,867,488
[45] Date of Patent: Feb. 2, 1999

[54] DIGITAL MULTI-CHANNEL SIMULCAST SYSTEM WITH CENTRALIZED TIMESTAMPING DEVICE

[75] Inventors: Mario Frank Derango, Wauconda; Gregory Allan Dertz, Algonquin, both of Ill.

[73] Assignee: Motorola, Inc., Schaumburg, Ill.

[21] Appl. No.: 678,443

[22] Filed: Jun. 30, 1996

[51] Int. Cl.[6] .............................. H04B 7/14; H04J 1/10; H04J 3/08

[52] U.S. Cl. ........................................ 370/315; 370/432

[58] Field of Search ..................... 370/389, 217, 370/218, 219, 220, 229, 230, 394, 395, 396, 397, 398, 399, 503, 509, 432, 315, 312, 310; 375/359; 455/502, 503, 11.1, 12.1

[56] References Cited

U.S. PATENT DOCUMENTS

| | | | |
|---|---|---|---|
| 5,339,311 | 8/1994 | Turner | 370/412 |
| 5,383,182 | 1/1995 | Therasse et al. | 370/412 |
| 5,402,415 | 3/1995 | Turner | 370/412 |
| 5,402,417 | 3/1995 | Aramaki | 370/412 |
| 5,455,965 | 10/1995 | Shaughnessy et al. | 455/503 |
| 5,485,632 | 1/1996 | Ng et al. | 455/503 |

*Primary Examiner*—Ajit Patel
*Attorney, Agent, or Firm*—George C. Pappas

[57] ABSTRACT

In a digital multi-channel simulcast system, a redundant centralized timestamping device acts as a simulcast controller for multiple channels simultaneously. All packets within a regional multi-channel system which require simulcast transmission are sent to a central timestamping device which determines the appropriate launch timestamp for each packet and attaches it thereto. The timestamping device is able to support concurrent timestamping sessions for each channel of a multiple channel system and can be dynamically assigned (trunked) to service any given radio channel on a packet by packet, call by call, or less frequent basis.

12 Claims, 3 Drawing Sheets

DIGITAL MULTI-CHANNEL SIMULCAST SYSTEM WITH CENTRALIZED TIMESTAMPING DEVICE

FIELD OF THE INVENTION

The present invention relates generally to digital simulcast communication systems and, in particular, to packet launch timestamping in a multi-channel simulcast system.

BACKGROUND OF THE INVENTION

Multiple site communication systems which comprise a plurality of repeaters and transceivers that are distributed throughout a large geographic region are well known. Many multi-site systems use same-frequency simulcast, i.e., the same communication channel (or carrier frequency) is used by multiple sites throughout the region to simultaneously relay communications to subscriber communication units that are located throughout the multi-site system. This is an efficient frequency reuse technique when the subscribers are routinely located throughout the multi-site system.

The use of comparators, and their associated voting algorithms, within simulcast communication systems is known. In general, a comparator, operably coupled to a plurality of base stations or satellite receivers located in geographically diverse areas, attempts to select or construct a favorable representation of an audio signal given multiple sources of the signal (e.g., the base stations). This is accomplished by comparing the signals received from the signal sources and selecting, from amongst all of the signal sources, portions of the signal having the best signal quality. The selected portions are then reassembled to produce a favorable voted signal frame. The voted signal frame can then be retransmitted by a base station, thereby increasing the probability of good reception (i.e., intelligibly decoded audio) at the signal destination (e.g., a mobile communication device). The signal selected as the best by the comparator is typically distributed therefrom to the transceiver sites for simultaneous re-transmission.

More recently, digital simulcast radio communication systems have been developed. In such systems, digital information is formatted into information frames. Each information frame is made up of a plurality of information packets that are transported through the system infrastructure.

All simulcasted information packets are processed through a comparator which receives inputs from multiple signal sources and selects an input signal source based on predetermined criteria of signal quality. The comparator, by way of a simulcast launch timestamp server coupled thereto (or incorporated therein), then assigns a launch time (launch timestamp) to each information packet received from the selected input signal source, and transmits the information packet over an infrastructure link to at least one of a plurality of base stations, where the information packet is temporarily stored in a buffer. At the assigned launch time, error correcting information is typically added to the information packet and the resulting data packet is transmitted by the base stations.

Simulcast systems which employ absolute launch timestamps require the distribution of a precise time reference—realized by a global positioning system (GPS) receiver or the like—to multiple timestamping resources in a multi-channel simulcast system. Typically, a dedicated comparator is assigned to provide voting to a single radio channel in a multi-channel simulcast system. In such a system, simulcast launch timestamping is performed independently by each comparator.

Timestamping is performed by the launch time stamper. The time stamp normally correlates the received signal with the time it was received (time of arrival). In the present exemplary embodiment, the time stamp represents a pre-calculated launch time for the eventual transmitted signal where the launch time is derived by adding a predetermined offset to the time of arrival. The predetermined offset is a constant that is chosen based on the expected worst case digital network transmission delay between any two sites.

For effective simulcast transmission, each transmitter associated with a given channel must have a replicated copy of the information packet to be transmitted (to the appropriately addressed receivers) in a buffer before the launch time.

The inclusion or assignment of a dedicated precise time reference generating means within each comparator has the effect of eliminating the need to distribute the time reference signal. However, although this scheme eliminates the time reference distribution requirement, it does so at considerable cost and complexity.

Furthermore, because a comparator dedicated to a single radio channel has only a single resource capable of timestamping, each channel has a single (non-redundant) point of failure.

Therefore, a need exists for a redundant centralized timestamping device which can function as a simulcast controller for multiple channels simultaneously.

DETAILED DESCRIPTION OF THE PREFERRED EMBODIMENTS

Generally, the present invention is directed to a digital multi-channel simulcast system having a redundant centralized timestamping device which can act as the simulcast controller for multiple channels simultaneously. In this regard, all packets within a regional multi-channel system which require simulcast transmission are sent to a central timestamping device which determines the appropriate launch timestamp for each packet and attaches it thereto. The timestamping device is able to support concurrent timestamping sessions for each channel of a multiple channel system and can be dynamically assigned (trunked) to service any given radio channel on a packet by packet, call by call, or less frequent basis.

Figure 1:
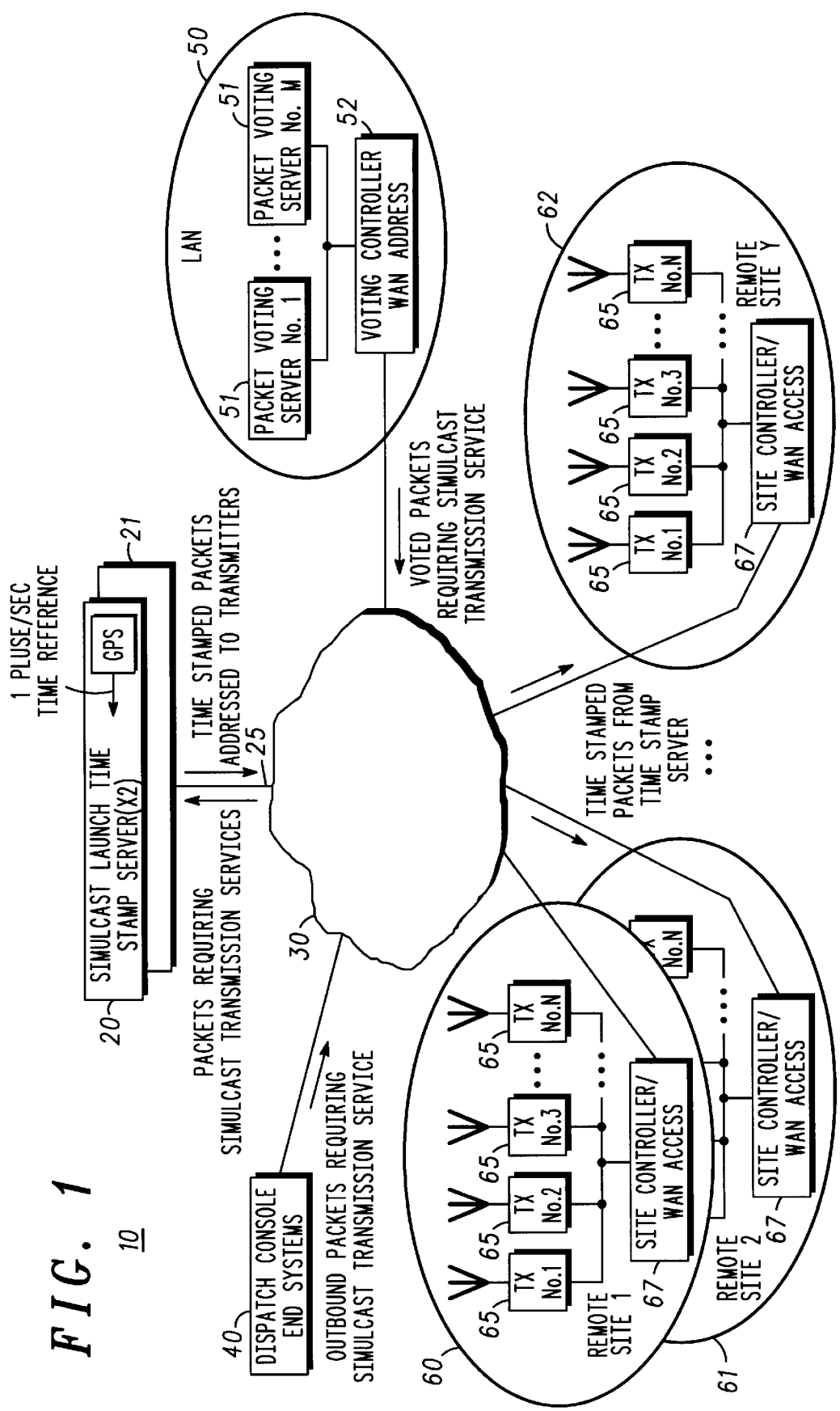
FIG. 1 illustrates a multi-channel simulcast system employing a centralized timestamping device constructed in accordance with a first preferred embodiment of the present invention.

The present invention can be more fully described with reference to FIGS. 1–3. FIG. 1 illustrates a block diagram depiction of a first embodiment of the present invention.

Referring to FIG. 1, there is shown a multi-channel simulcast system 10 comprising a primary simulcast launch timestamp server (SLTS) 20 coupled (via, for example, a single physical connection 25) to a communication packet-switched network, such as for example a wide area network (WAN) 30 or a local area network (LAN), to allow multiple logical connections to be supported simultaneously on a single physical connection. A second SLTS 21, connected to the primary SLTS 20, provides load sharing functionality and system redundancy in the event that SLTS 20 fails.

The SLTS 20 is configured to accept packets requiring simulcast transmission service on the outbound radio channel. These packets may be sourced from wireline based end systems 40, such as dispatch consoles, or may be voted packets from a comparator site LAN 50 having one or more packet voting servers 51, each of which may be associated with one or more given channels and functions to source voted packets to the WAN 30—via a WAN access voting controller 52—to be repeated to the outbound simulcast radio channel. Multi-session voting by a single packet voting server is described in a related co-pending application in which the inventors of the present application are also named as co-inventors, entitled "Packet Voting Server and Associated Method for Performing Voting Services on Multiple Radio Channels Simultaneously", filed concurrently herewith and incorporated herein by reference. Timestamped packets for a given session are sent from the SLTS 20 to one or more sites 60, 61, 62, each comprising a plurality of simulcast transmitters 65 coupled to the WAN 30 via a WAN access site controller 67.

In the preferred constructional embodiment, the SLTS 20 is configured as a centralized timestamping device and includes a GPS receiver for generating a precise time reference (generally a 1 pulse/second (1 PPS) signal) required for launch timestamping. Alternatively, the GPS receiver may be external to the SLTS 20 and the 1 PPS signal may be interfaced via a coaxial cable. For a given radio channel, the SLTS 20 uses the time reference and knowledge of the packet air time duration to calculate the appropriate timestamp using conventional timestamping techniques.

In the constructional embodiment, the SLTS 20 supports multiple radio channels concurrently with the single time reference. During a timestamping session, launch times are assigned to all packets requiring simulcast transmission service. A demultiplexing identifier (either explicitly identified in an accepted packet waiting timestamping or attached internally by the SLTS 20 on the basis of a connection identifier from the WAN 30) to keep each channel timestamping session independent. All timestamped packets for a given session are sent from the SLTS 20 to the set of simulcast transmitters 65 operating on a common radio frequency.

Figure 2:
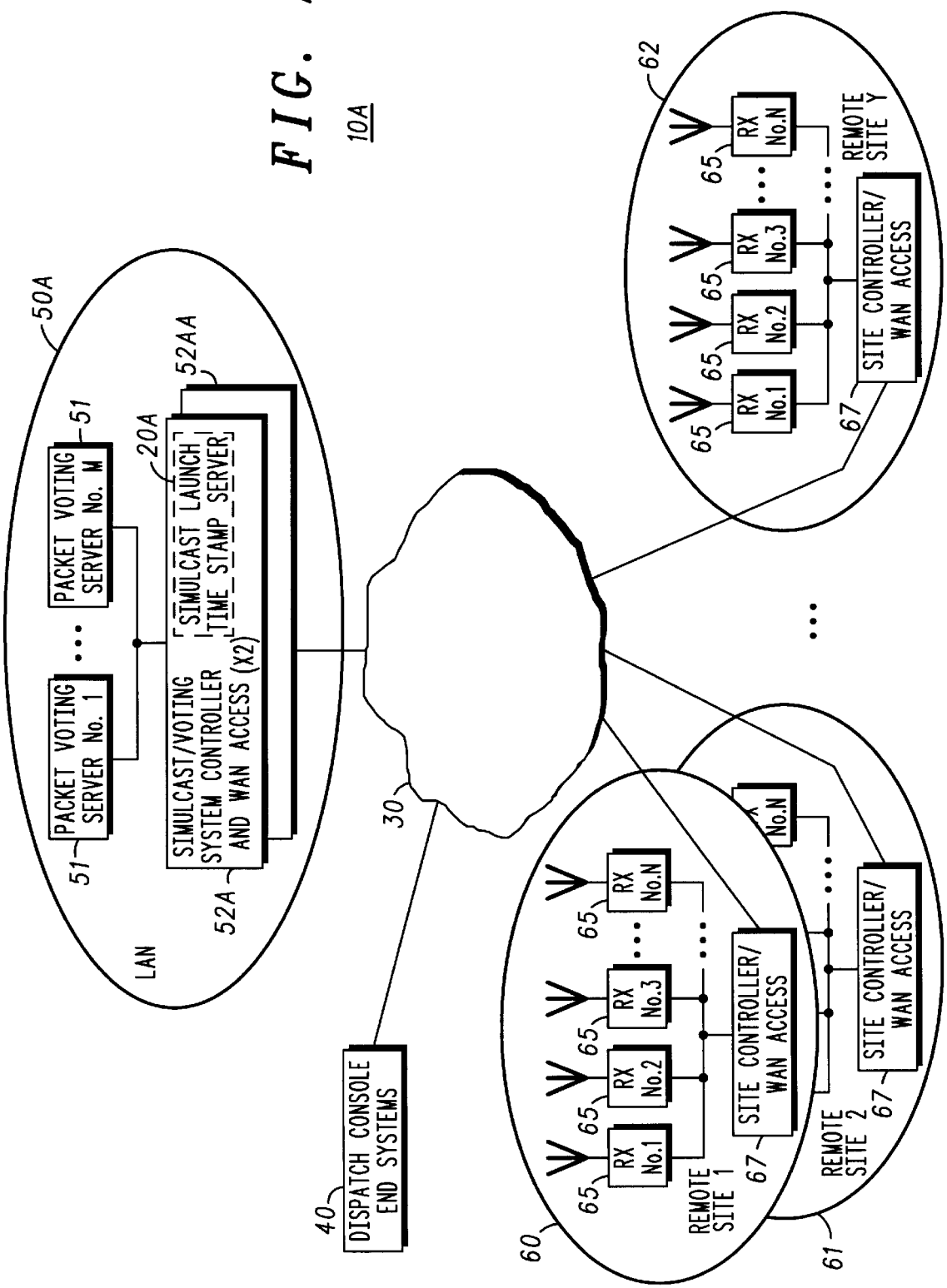
FIG. 2 illustrates a multi-channel simulcast system employing a centralized timestamping device constructed in accordance with a second preferred embodiment of the present invention.

FIG. 2 illustrates a block diagram depiction of a second embodiment of the present invention showing a multi-channel simulcast system 10A wherein the functionality and operation of the SLTS, designated by the numeral 20A, is physically and logically bundled in one programmable device, forming part of the comparator site 50A logic circuitry. More specifically, SLTS 20A forms part of a simulcast voting controller 52A, thus facilitating integration of the functionality required for simulcast/voting systems. It should be appreciated that like numerals are used in the figures to identify similar components and system functionality.

Figure 3:
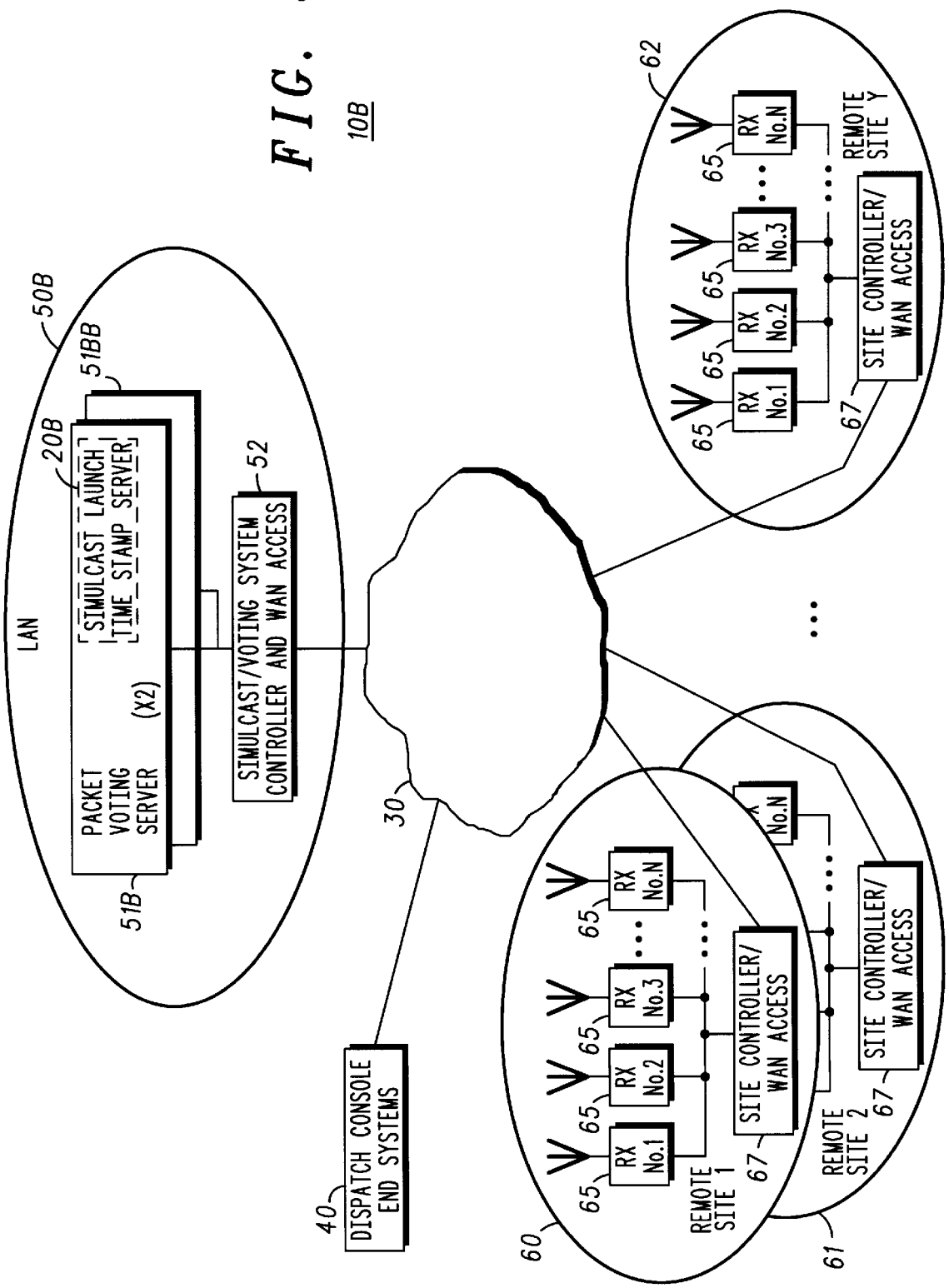
FIG. 3 illustrates a multi-channel simulcast system employing a centralized timestamping device constructed in accordance with a third preferred embodiment of the present invention.

In yet another alternative construction illustrated by the multi-channel simulcast system 10B shown in FIG. 3, the SLTS functionality, designated by the numeral 20B, is similarly bundled with a server device 51B, the latter collectively employing the packet voting servers 51 (1 through m) depicted in FIGS. 1 and 2 to perform voting services on multiple channels.

The architectures of multi-channel simulcast systems 10A and 10B facilitate providing fault tolerance and redundancy of comparator functionality, as well as timestamping functionality, by the integration thereto of redundant circuitry, generally designated by the numerals 52AA and 51BB in FIGS. 2 and 3, respectively.

The presently disclosed embodiments permit a redundant single timestamp device—referred to as an SLTS—to support multiple simulcast sessions occurring on multiple radio channels simultaneously, whereas previously, a unique timestamp device was required for each radio channel. Moreover, the system architecture of the present embodiments no longer requires distribution hardware for the precise time reference source, whereas current devices presently require such hardware.

Another advantage of the present invention is that a single physical connection 25 need only be employed by the SLTS 20 to the WAN 30 rather than plural dedicated connections from each packet source. The elimination of plural time reference distribution cabling results in easier installation and device maintenance.

Additionally, the centralized timestamping nature of the SLTS architecture described herein, facilitates dynamically loading/updating simulcast transmission parameters in a single device (20, 52AA, 51BB) to take effect throughout the whole system (10, 10A, 10B, respectively). Thus, a single timestamping device can be programmed with all the system simulcast parameters rather than requiring the same information to be entered into, for example, many comparators where each is provided with a separate dedicated timestamping device.

The present invention also provides for a single wireline packet mode LAN/WAN connection which enables multi-channel connectivity in a manner that is not otherwise possible with the individual point to point serial circuit connections of conventional comparator architectures, the benefits of which are detailed in a related application by the same inventors entitled "Non-Packet Replicating Comparator Device for Digital Simulcast Packet Distribution", filed concurrently herewith.

Finally, it should be appreciated that as a result of the centralized timestamping nature of the system architectures described herein, diagnostics are simplified because all timestamping operations can be monitored from a single device.

While the present invention has been particularly shown and described with reference to particular embodiments thereof, it will be understood by those skilled in the art that various changes in form and details may be made therein without departing from the spirit and scope of the present invention.

We claim:

1. A digital simulcast communication system supporting multiple radio channels, comprising:
   a plurality of transmitters;
   a primary centralized simulcast launch timestamp server including a single time reference source for assigning launch timestamps to inbound packets to generate a corresponding number of timestamped outbound packets, each inbound packet corresponding to a given one of said multiple radio channels;
   a communication packet-switched network for distributing each of the timestamped outbound packets to predetermined ones of said plurality of transmitters on the basis of the radio channel corresponding thereto; and a comparator site network coupled to said packet-switched network for generating said inbound packets;

wherein said comparator site network includes a plurality of packet voting servers, each for voting inbound source signals over a corresponding one of said multiple radio channels to generate a respective one of said inbound packets, and a voting controller for sourcing said inbound packets to said packet-switched network.

2. The digital simulcast communication system of claim 1, further comprising a second centralized simulcast launch timestamp server coupled to said primary timestamp server to provide load sharing functionality and system redundancy therefor.

3. The digital simulcast communication system of claim 1, wherein said packet voting servers and said primary timestamp server are the same device.

4. The digital simulcast communication system of claim 1, wherein said voting controller and said primary timestamp server are the same device.

5. The digital simulcast communication system of claim 1, wherein said comparator site network and said primary timestamp server are separate devices.

6. A digital simulcast communication system supporting multiple radio channels, comprising:

a plurality of transmitters;

a primary centralized simulcast launch timestamp server including a single time reference source for assigning launch timestamps to inbound packets to generate a corresponding number of timestamped outbound packets, each inbound packet corresponding to a given one of said multiple radio channels;

a communication packet-switched network for distributing each of the timestamped outbound packets to predetermined ones of said plurality of transmitters on the basis of the radio channel corresponding thereto; and a comparator site network coupled to said packet-switched network for generating said inbound packets, said comparator site network including a plurality of packet voting servers, each for voting inbound source signals over a corresponding one of said multiple radio channels to generate a respective one of said inbound packets, and a voting controller for sourcing said inbound packets to said packet-switched network.

7. The digital simulcast communication system of claim 6, wherein said packet voting servers and said primary timestamp server are the same device.

8. The digital simulcast communication system of claim 6, wherein said voting controller and said primary timestamp server are the same device.

9. The digital simulcast communication system of claim 6, wherein said comparator site network and said primary timestamp server are separate devices.

10. The digital simulcast communication system of claim 1, wherein said communication packet-switched network is coupled to said primary timestamp server via a single physical connection.

11. The digital simulcast communication system of claim 1, wherein said single time reference source is a global positioning system (GPS) receiver.

12. The digital simulcast communication system of claim 1, wherein said primary timestamp server includes means for loading simulcast timestamp parameters.

* * * * *